(12) United States Patent
Jang et al.

(10) Patent No.: US 8,446,948 B2
(45) Date of Patent: *May 21, 2013

(54) METHOD OF PROGRESSIVELY CODING/DECODING 3-D MESH INFORMATION AND APPARATUS THEREOF

(75) Inventors: Euee-seon Jang, Suwon (KR); Sung-jin Kim, Suwon (KR); Mun-sup Song, Seoul (KR); Mahn-jin Han, Seoul (KR); Yang-seock Seo, Seoul (KR); Seok-yoon Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1348 days.

This patent is subject to a terminal disclaimer.

(21) Appl. No.: 11/785,565

(22) Filed: Apr. 18, 2007

(65) Prior Publication Data

US 2007/0194975 A1    Aug. 23, 2007

Related U.S. Application Data

(63) Continuation of application No. 09/396,470, filed on Sep. 15, 1999, now Pat. No. 7,224,729, which is a continuation of application No. 09/197,646, filed on Nov. 23, 1998, now abandoned.

(30) Foreign Application Priority Data

Aug. 29, 1998  (KR) ..................................... 98-35419
Mar. 20, 1999  (KR) ....................................... 99-9528

(51) Int. Cl.
*H04B 1/66*   (2006.01)
*G06K 9/36*   (2006.01)

(52) U.S. Cl.
USPC ..................................... 375/240.08; 382/243

(58) Field of Classification Search
USPC ................. 348/699, 416, 413, 384, 394, 395, 348/400, 401, 402, 403, 404, 407, 408, 410, 348/415, 420, 425, 412; 382/236, 241, 243, 382/237, 238, 240, 248, 250, 232, 154; 375/240, 375/240.01, 240.08, 240.09
See application file for complete search history.

(56) References Cited

U.S. PATENT DOCUMENTS 5,654,771 A    8/1997   Tekalp et al.
5,818,463 A   10/1998   Tao et al.

(Continued)

FOREIGN PATENT DOCUMENTS

JP          09-198524         7/1997

OTHER PUBLICATIONS

Guozhong Zhuang, "Compression and Progressive Transmission of the Three-Dimensional Models," A Thesis Submitted to the Faculty of Purdue University, Dec. 1998, pp. 1-136.

(Continued)

*Primary Examiner* — Behrooz Senfi
(74) *Attorney, Agent, or Firm* — Staas & Halsey LLP

(57) ABSTRACT

A method of progressively coding/decoding 3-D mesh information, and an apparatus therefor are provided. The progressive 3-D mesh information coding method includes the steps of reconstructing an input 3-D mesh into a plurality of mesh components, coding each of the plurality of mesh components, and multiplexing the plurality of coded mesh components into a compressed bit stream and transmitting the compressed bit stream. The method of progressively decoding the transmitted, compressed bit stream which has been coded by the coding method, includes dividing the transmitted bit stream into a plurality of coded mesh components, decoding each of the plurality of coded mesh components, and reconstructing a 3-D mesh by synthesizing the plurality of decoded mesh components.

12 Claims, 12 Drawing Sheets

U.S. PATENT DOCUMENTS

| | | | |
|---|---|---|---|
| 5,870,094 A | 2/1999 | Deering | |
| 5,905,502 A | 5/1999 | Deering | |
| 6,064,771 A | 5/2000 | Migdal et al. | |
| 6,072,496 A | 6/2000 | Guenter et al. | |
| 6,144,773 A | 11/2000 | Kolarov et al. | |
| 6,262,737 B1 * | 7/2001 | Li et al. | 345/419 |
| 6,438,266 B1 * | 8/2002 | Bajaj et al. | 382/243 |
| 7,224,729 B1 * | 5/2007 | Jang et al. | 375/240.08 |

OTHER PUBLICATIONS

Gabriel Taubin et al., "Geometric Compression Through Topological Surgery," ACM Transactions on Graphics, Apr. 1998, vol. 17, No. 2, p. 84-115.

Matthia Eck et al., "Multiresolution Analysis of Arbitrary Meshes," Computer Graphics Proceedings, Annual Conference Series, 1995, p. 173-182.

Hugues Hoppe, "Progressive Meshes," Computer Graphics Proceedings, Annual Conference Series, 1996, p. 99-108.

Jiankun Li et al., "Progressive Compression of 3D Graphic Models," IEEE, 1997, p. 135-1426.

Jiankun Li et al., "Embedded Coding of 3-D Graphic Models," IEEE, 1997, p. 57-60.

Japanese Office Action dated May 6, 2004 in Japanese Application No. 1999-242692 10 pages (English Translation 12 pages).

* cited by examiner

MCOM0  MCOM1  MCOM2

US 8,446,948 B2

METHOD OF PROGRESSIVELY CODING/DECODING 3-D MESH INFORMATION AND APPARATUS THEREOF

This application is a continuation of U.S. patent application Ser. No. 09/396,470 filed on Sep. 15, 1999 (now U.S. Pat. No. 7,224,729), which is a continuation-in-part of U.S. patent application Ser. No. 09/197,646 filed on Nov. 23, 1998, (now abandoned), and claims the priority benefit of Korean Patent Application No. 99-9528 filed on Mar. 20, 1999, and Korean Patent Application No. 98-35419 filed on Aug. 29, 1998, which were filed in the Korean Intellectual Property Office, the disclosures of each of which are incorporated herein by reference.

BACKGROUND OF THE INVENTION

1. Field of the Invention

The present invention relates to coding/decoding of 3-D mesh information, and more particularly, to a progressive coding/decoding method for 3-D mesh information which is used in the field of moving picture expert group (MPEG)-4 synthetic and natural hybrid coding (SNHC) and a virtual reality modeling language (VRML), and an apparatus thereof.

2. Description of the Related Art

Not only efficient coding of mesh data but also progressive reconstruction of transmitted mesh data is recognized as an important requisite for transmission of a 3-D object including 3-D mesh. When mesh data is damaged by a communications line error during transmission, part of the damaged mesh data can be reconstructed with already-transmitted mesh data by a progressive reconstruction technique. Thus, the amount of mesh data to be retransmitted is minimized. This progressive reconstruction technique is expected to be effectively used in future wireless communications or communications at a low transmission rate, since this technique has strong characteristics with respect to communications line errors.

FIG. 1 is a conceptual block diagram of a conventional 3-D mesh information coding/decoding apparatus. Referring to FIG. 1, a coding unit 101 is comprised of a connectivity information coder 102, a geometry information coder 103, and an entropy coder 104, and a decoding unit 112 is comprised of an entropy decoder 106, a connectivity information decoder 107, and a geometry information decoder 108.

A conventional method of compressing 3-D mesh data, which is used in MPEG, will now be described referring to FIG. 1. 3-D mesh data 100 input to the coding unit 101 includes connectivity information and geometry information, and the two types of information are coded respectively by the connectivity information coder 102 and the geometry information coder 103. Here, information 105 on a vertex structure is transmitted from the connectivity information coder 102 to the geometry information coder 103. Information compressed by the connectivity information coder 102 and the geometry information coder 103 is converted into a compressed bit stream 111 by the entropy coder 104.

The compressed bit stream 111 is input to the decoding unit 112 and decoded as follows. The compressed bit stream 111 is divided into connectivity information and geometry information via the entropy decoder 106, and the two types of information are decoded by the connectivity information decoder 107 and the geometry information decoder 108, respectively. Similar to the coding unit 101, information 109 on a vertex structure is transmitted from the connectivity information decoder 107 to the geometry information decoder 108. A reconstructed 3-D mesh 110 can be obtained by decoded connectivity information and decoded geometry information.

As shown in FIG. 1, a 3-D mesh is transmitted in the form of a compressed bit stream on a communications line. However, since the conventional method uses the entropy coder, it has poor resistance to transmission errors which may be generated in a communications line.

Since conventional coding with respect to 3-D mesh data is accomplished in units of the entire mesh data, it is almost impossible to perform partial reconstruction before the entire bit stream is transmitted upon transmission of coded data. Also, conventional 3-D mesh coding has an inefficiency problem in that even when a very small portion of data is damaged by an error of a communications line caused upon transmission, the entire mesh data must be transmitted again. For example, an encoding method (ISO/IEC JTC1/SC29/WG11 MPEG98/W2301, MPEG-4 SNHC Verification Model 9.0) proposed by the IBM company has been used for MPEG-4 SNHC 3-D mesh coding.

SUMMARY OF THE INVENTION

To solve the above problems, it is an object of the present invention to provide a progressive 3-D mesh information coding/decoding method by which partial classification and partial reconstruction are possible by reconstructing a model so that it can be processed in units of parts, so that progressive picture reproduction becomes possible through progressive decoding, and transmission errors are dealt with well, and an apparatus therefor.

It is another object of the present invention to provide a progressive 3-D mesh information coding/decoding method by which independent coding and decoding are possible by dividing a model into independent step meshes or mesh components, so that progressive picture reproduction becomes possible through progressive decoding, and transmission errors are dealt with well, and an apparatus therefor.

Accordingly, to achieve the first object, the present invention provides a progressive 3-D mesh information coding method which includes the steps of: (a) reconstructing a 3-D mesh into a plurality of mesh components; (b) coding each of the plurality of mesh components; and (c) multiplexing the plurality of coded mesh components into a bit stream and transmitting the bit stream.

To achieve the first object, the present invention also provides a progressive 3-D mesh information decoding method which includes the steps of: (a) dividing the transmitted bit stream into a plurality of coded mesh components; (b) decoding each of the plurality of coded mesh components; and (c) reconstructing a 3-D mesh by synthesizing the plurality of decoded mesh components.

To achieve the first object, the present invention provides a progressive 3-D mesh information coding apparatus which includes: a 3-D data analyzer for reconstructing a 3-D mesh into a plurality of mesh components; a plurality of component coders for coding the plurality of mesh components; and a multiplexer for multiplexing the plurality of coded mesh components into a bit stream.

To achieve the first object, the present invention provides a progressive 3-D mesh information decoding apparatus includes: a demultiplexer for dividing the transmitted bit stream into a plurality of coded mesh components; a plurality of component decoders for decoding the plurality of coded mesh components; and a 3-D data synthesizer for synthesizing the plurality of decoded mesh components to reconstruct a 3-D mesh.

To achieve the second object, the present invention provides another progressive 3-D mesh information coding/decoding method which includes the steps of: (a) extracting one or more independent mesh object layers from a 3-D mesh; (b) independently coding and transmitting the mesh object layers; and (c) obtaining one or more independent mesh object layers by decoding the independently coded and transmitted mesh object layers, the method further comprising the step of (d) synthesizing the independent mesh object layers and removing redundant information to reconstruct the original 3-D mesh.

To achieve the second object, the present invention provides another progressive 3-D mesh information coding/decoding apparatus which includes: a 3-D mesh object layer analyzer for receiving a 3-D mesh and extracting one or more mesh object layers from the received 3-D mesh; one or more mesh object layer coders for independently coding and transmitting the mesh object layers; and one or more mesh object layer decoders for decoding the mesh object layers which have been independently coded and transmitted, to obtain one or more independent mesh object layers, the apparatus further including a 3-D mesh object layer synthesizer for synthesizing the independent mesh object layers and removing redundant information to reconstruct the original 3-D mesh.

To achieve the second object, the present invention provides a still another progressive 3-D mesh information coding/decoding method which includes the steps of: (a) extracting one or more mesh object layers from a 3-D mesh and dividing each mesh object layer into a plurality of independent mesh components; (b) independently coding and transmitting the plurality of mesh components; and (c) obtaining a plurality of independent mesh components by decoding the plurality of independently coded and transmitted mesh components, the method further comprising the step of (d) synthesizing the independent mesh components and removing redundant information between adjacent mesh components to reconstruct the original 3-D mesh.

To achieve the second object, the present invention provides a still another progressive 3-D mesh information coding/decoding apparatus which includes: a 3-D mesh object layer analyzer for receiving a 3-D mesh, extracting one or more mesh object layers from the received 3-D mesh, and dividing each mesh object layer into a plurality of independent mesh components; a plurality of mesh component coders for independently coding and transmitting the plurality of mesh components; and a plurality of mesh component decoders for decoding the plurality of mesh components which have been independently coded and transmitted, to obtain a plurality of independent mesh components, the apparatus further comprising a 3-D data synthesizer for synthesizing the plurality of independent mesh components and removing redundant information between adjacent mesh components to reconstruct the original 3-D mesh.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
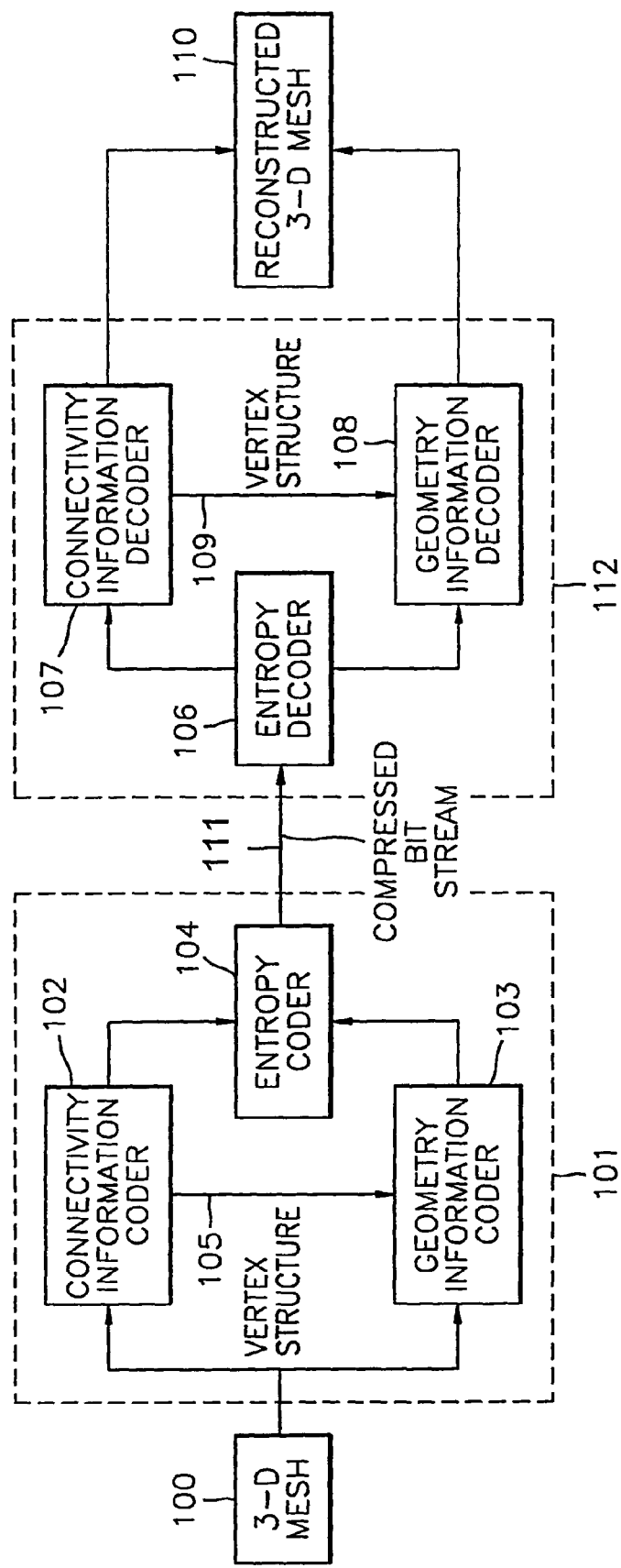
FIG. 1 is a conceptual block diagram illustrating a conventional 3-D mesh information coding/decoding method.
Figure 2:
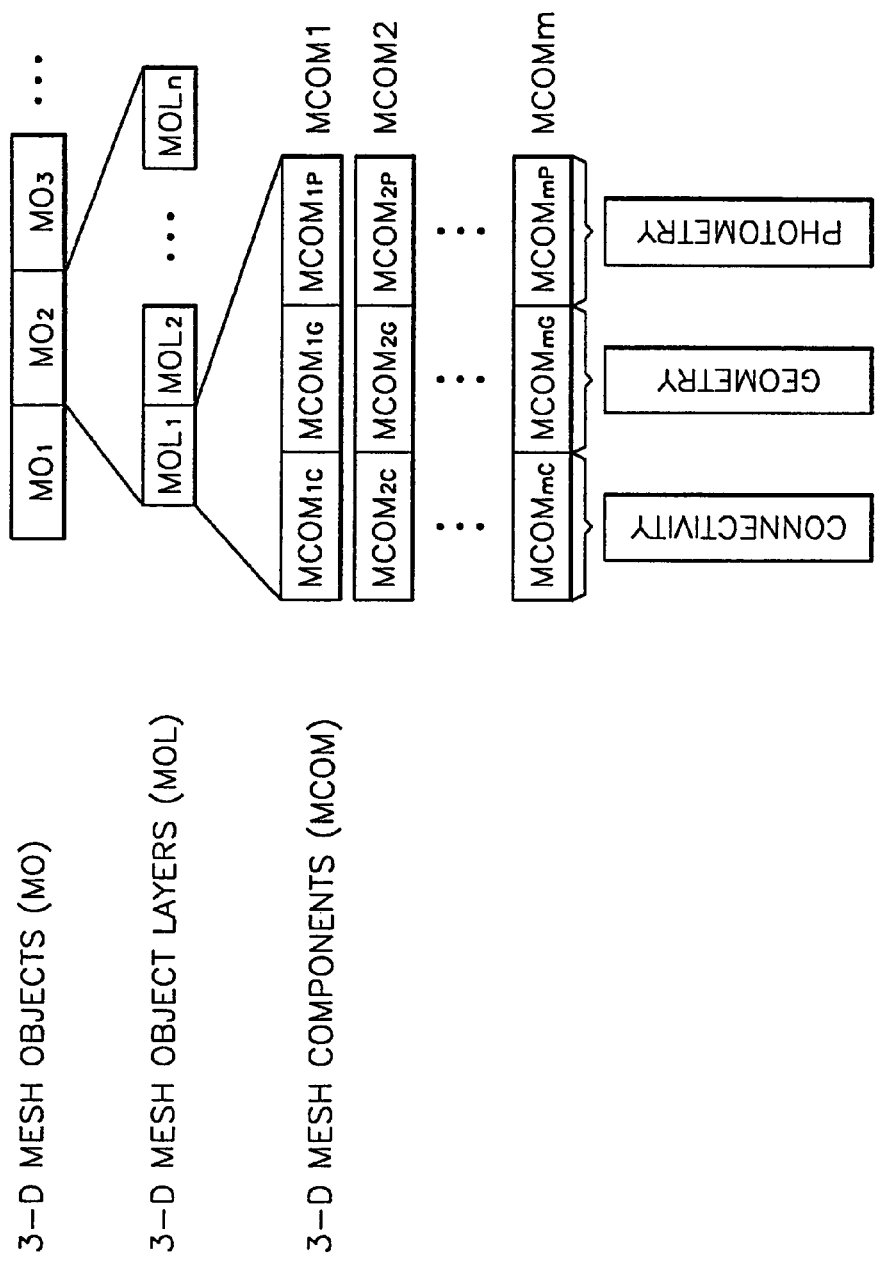
FIG. 2 is a conceptual block diagram illustrating the structure of progressive 3-D mesh information according to the present invention.

The present invention proposes a new mesh structure as shown in FIG. 2, to deal with a progressive 3-D mesh. Referring to FIG. 2, the 3-D mesh object (MO) can be comprised of mesh object layers (MOLs) obtained by dividing information in the mesh into layers. Here, each MOL includes one or more mesh components (MCOM). One mesh component (MCOM) includes connectivity information, geometry information, and other information such as photometry information. That is, the MO is defined as a 3-D mesh object (MO) unit to be coded, and is classified into a plurality of layers according to the various image qualities and functions of the above-described mesh information. Each of the layers is defined as MOLs. When one 3-D MOL is comprised of several independent types of mesh information (that is, connectivity components) having no connectivity therebetween using a topological surgery method, independent mesh information is synthesized or divided according to the size of data to be coded and other characteristics and the results are defined as MCOMs.

Figure 3:
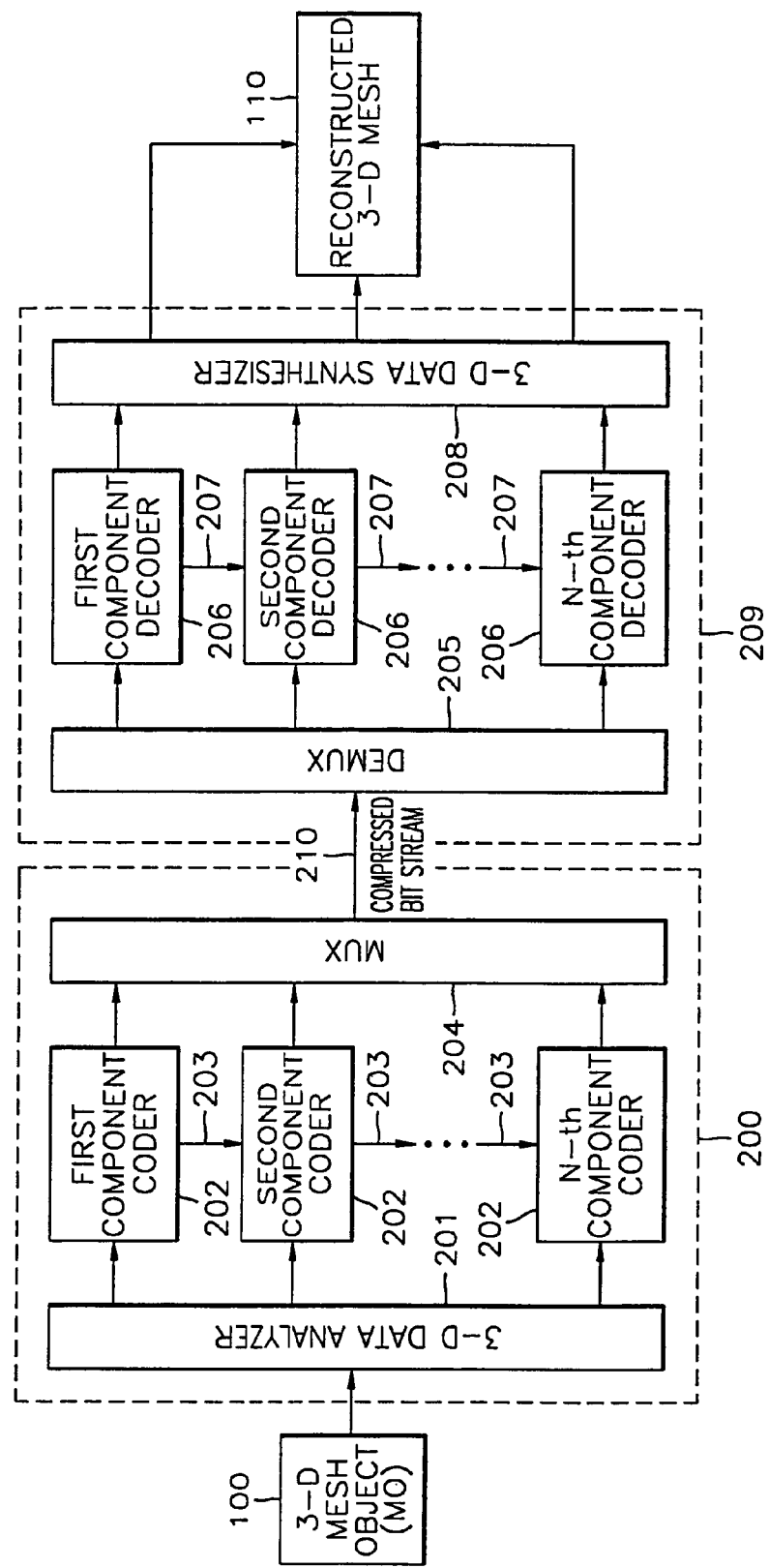
FIG. 3 is a conceptual block diagram illustrating a progressive 3-D mesh information coding/decoding method according to a preferred embodiment of the present invention.

Referring to FIG. 3, a progressive 3-D mesh information coding/decoding apparatus according to a preferred embodiment of the present invention includes a coding unit 200 and a decoding unit 209. The coding unit 200 includes a 3-D data analyzer 201, a plurality of first through N-th component coders 202, and a multiplexer (MUX) 204. The decoding unit 209 includes a demultiplexer (DMUX) 205, a plurality of first through N-th component decoders 206, and a 3-D data synthesizer 208.

Referring to FIG. 3, first, a 3-D mesh object (MO) 100 is reconstructed into a plurality of mesh components (MCOM) by the 3-D data analyzer 201, and the plurality of mesh components are input to the plurality of first through N-th component coders 202, respectively. Here, several mesh components (MCOM) can constitute an MOL. Each of the MCOMs is compressed by a corresponding component coder 202, and the compressed bit streams are multiplexed by the MUX 204 and transmitted. Here, MOL or MCOM information 203 used in an already-operated component coder can be used in a component coder not yet operated. For example, information 203 used in the first component coder which is an upper component coder, is also transmitted to a second component coder which is a lower component coder, and can be used therein.

The compressed bit stream transmitted to the decoding unit 209 is classified into MOLs, and each MOL is again divided into mesh components (MCOMs) by the DMUX 205. The mesh components are decoded by the plurality of first through N-th component decoders 206. Also in the decoding unit 209, information 207 generated by an already-operated component decoder is reused in a component decoder not yet operated. For example, information 207 generated by the first component decoder which is an upper component decoder, is transmitted to a second component decoder which is a lower component decoder. The decoded mesh components (MCOMs) are reconstructed by the 3-D data synthesizer 208 into a 3-D mesh 110.

Figure 4:
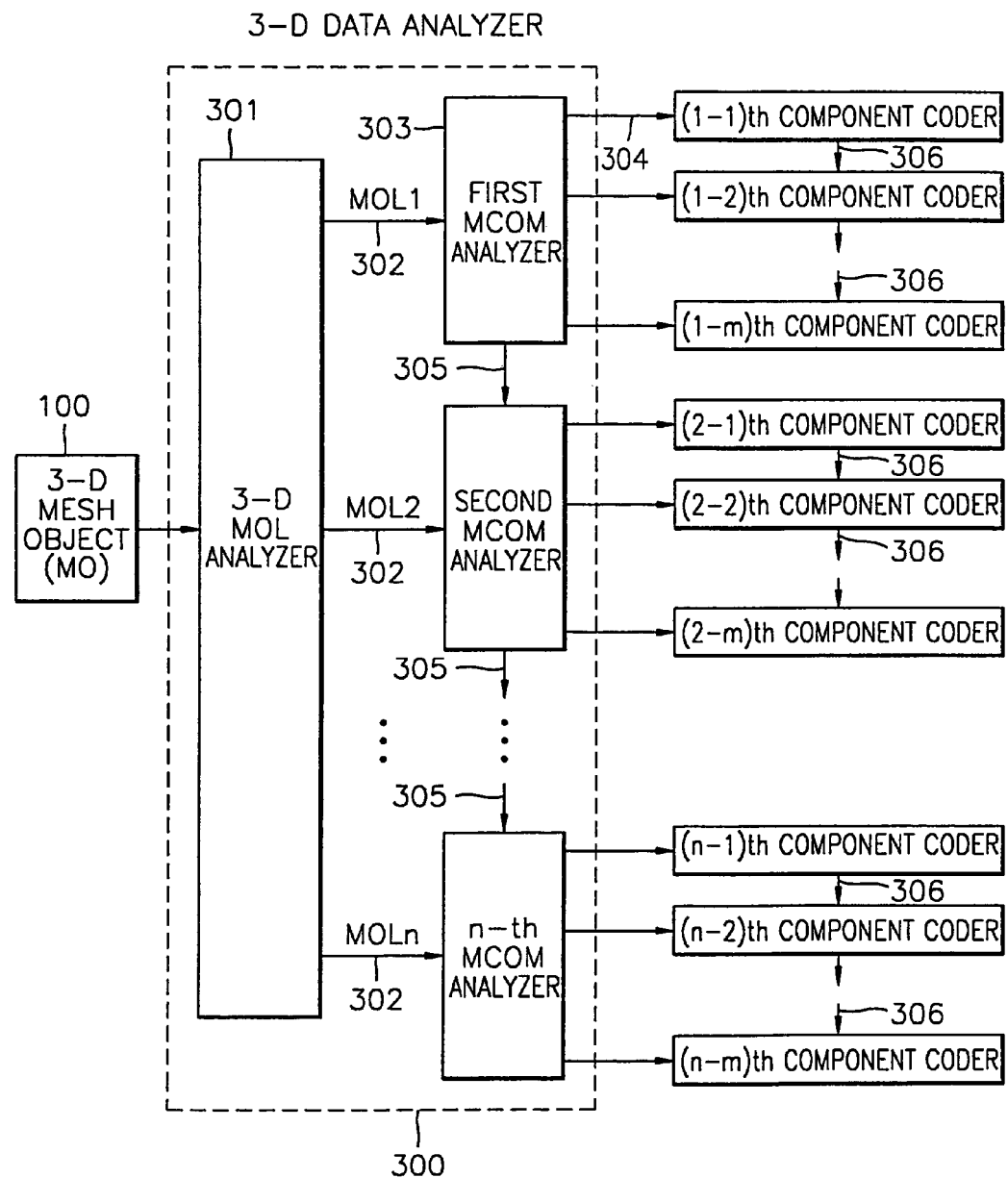
FIG. 4 is a block diagram illustrating a preferred embodiment of the 3-D data analyzer shown in FIG. 3.

When the 3-D MO is first classified into one or more MOLs and then divided into MCOMs, the 3-D data analyzer 201 can be constituted as shown in FIG. 4.

Referring to FIG. 4, a preferred embodiment of the 3-D data analyzer 201 of FIG. 3 includes a 3-D MOL analyzer 301 and a plurality of first through n-th MCOM analyzers 303.

When the 3-D MO 100 is input to the 3-D data analyzer 300, the 3-D MOL analyzer 301 extracts MOL1 through MOLn 302 from the input 3-D MO. Then, the extracted MOL1 through MOLn 302 are each divided into mesh components 304 by the first through n-th MCOM analyzers 303. The mesh components 304 are output from the data analyzers. Each mesh component 304 is input to a corresponding component coder among (1-1)th through (1-m)th component coders, (2-1)th through (2-m) component coders, etc.

Each of the MCOM analyzers uses information generated by its upper MCOM analyzer, and the component coders for one MCOM analyzer uses information generated by an above component coder corresponding to the same MCOM analyzer. However, information 305 used in an arbitrary MCOM analyzer may not be used in another MCOM analyzer. In this case, an independent mesh object layer information coding/decoding method can be performed in a structure shown in FIG. 5.

Figure 5:
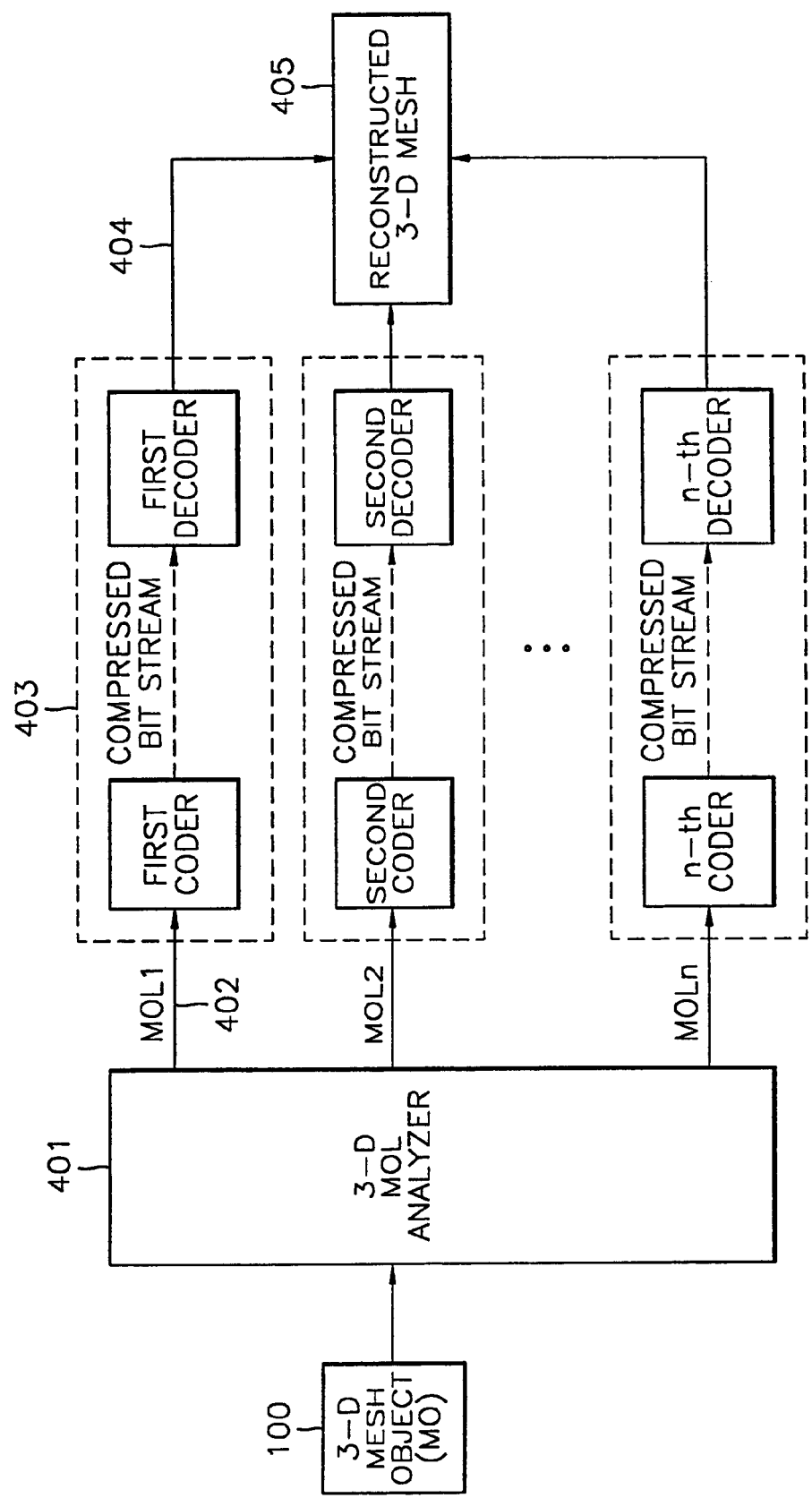
FIG. 5 is a conceptual block diagram illustrating a progressive 3-D mesh information coding/decoding method according to another preferred embodiment of the present invention.

Referring to FIG. 5, a progressive 3-D mesh information coding/decoding apparatus according to another embodiment of the present invention includes a 3-D MOL analyzer 401, and a plurality of first through n-th independent coders/decoders 403.

In this embodiment shown in FIG. 5, information generated by any one coder is not used in the other coders. That is, after MOL1 through MOLn 402 are generated from the 3-D mesh object (MO) 100 by the 3-D MOL analyzer 401, they are compressed, transmitted, decoded and reconstructed respectively by the independent coders/decoders 403. Here, each of the coders and decoders includes an MCOM analyzer, so that each can divide a MOL into MCOMs and code/decode them. Information 404 decoded by the decoders is independent MOL data, so a 3-D mesh 405 is reconstructed by simply collecting this information. However, in this case, the reconstructed 3-D mesh 405 also includes extra information which was generated when the 3-D MOL analyzer 401 classified the 3-D mesh object (MO) 100 into the MOL1 through MOLn 402.

Figure 6:
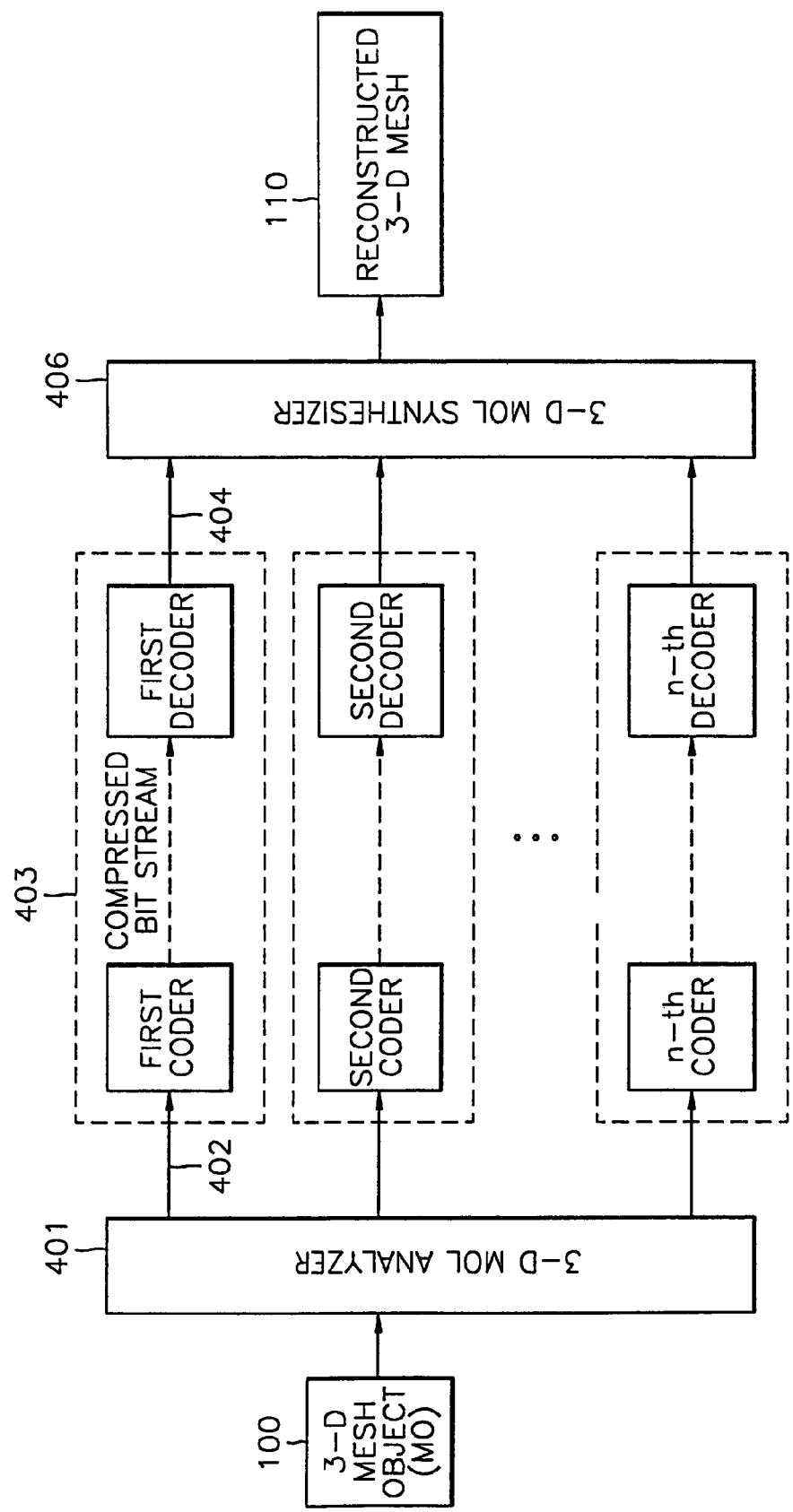
FIG. 6 is a block diagram of FIG. 5 to which a 3-D MOL synthesizer is added.

Referring to FIG. 6, the preferred embodiment shown in FIG. 5 further includes a 3-D MOL synthesizer 406. The 3-D MOL synthesizer 406 is added to obtain a reconstructed 3-D mesh 110 which is the same as the original 3-D mesh MO 100 by removing the additional information included in the reconstructed 3-D mesh 405. The 3-D MOL synthesizer 406 collects information 404 decoded by the decoders and removes redundant information, thereby reconstructing the original 3-D mesh 110.

Meanwhile, the component coders in FIG. 4 share information, but information 306 used in one component coder may not be used in the other component coders. In this case, an independent component mesh information coding/decoding method can be performed in a structure shown in FIG. 7.

Figure 7:
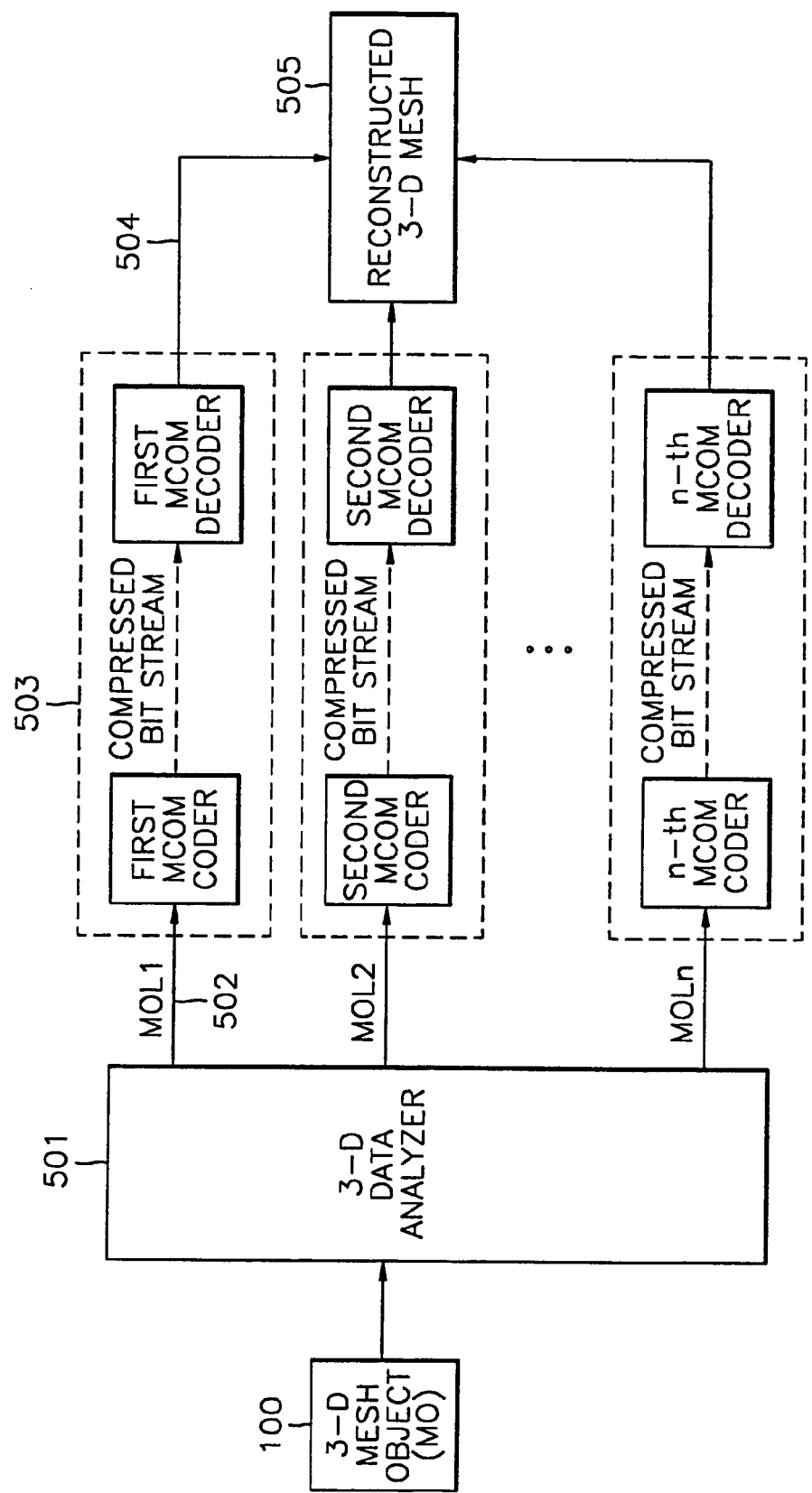
FIG. 7 is a conceptual block diagram illustrating a progressive 3-D mesh information coding/decoding method according to still another preferred embodiment of the present invention.

Referring to FIG. 7, a progressive 3-D mesh information coding/decoding apparatus according to still another embodiment of the present invention includes a 3-D data analyzer 501, and a plurality of first through n-th independent MCOM coders/decoders 503.

In the embodiment shown in FIG. 7, information used in an already-operated coder will not be used in a coder not yet operated. That is, the 3-D mesh MO 100 is divided into mesh components MCOM1 through MCOMn 502 by the 3-D data analyzer 501 which includes a 3-D MOL analyzer and a plurality of MCOM analyzers, and the mesh components 502 are then compressed, transmitted, decoded and reconstructed by the independent first through n-th MCOM coders/decoders 503, respectively. Information 504 decoded by the decoders is independent mesh component data, so reconstruction of a 3-D mesh 505 is accomplished by simply collecting this data. However, when the 3-D data analyzer 501 divides one mesh object layer into a plurality of mesh components, the mesh components share boundary information such as an edge, the attributes of the coordinates of points, or those of the units of points. Thus, much redundant information exists in the reconstructed 3-D mesh 505.

Figure 8:
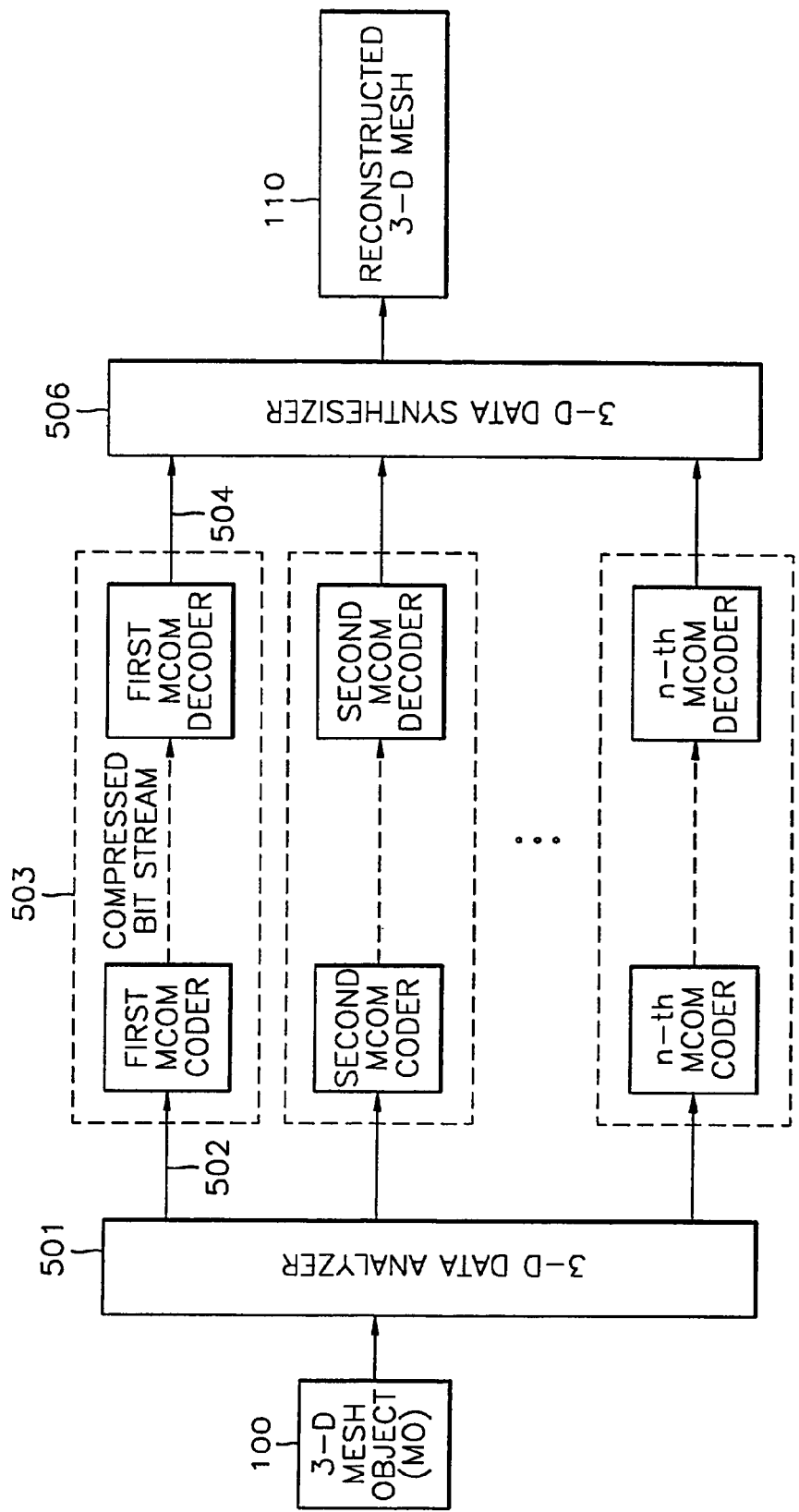
FIG. 8 is a block diagram of FIG. 7 to which a 3-D data synthesizer is added.

Referring to FIG. 8, still another preferred embodiment shown in FIG. 7 further includes a 3-D data synthesizer 506. The 3-D data synthesizer 506 is added as shown in FIG. 8 to increase coding efficiency by removing redundant information included in the reconstructed 3-D mesh 505. The 3-D data synthesizer 506 collects information 504 decoded by the decoders and removes redundant information, thereby reconstructing the original 3-D mesh 110.

Figure 9:
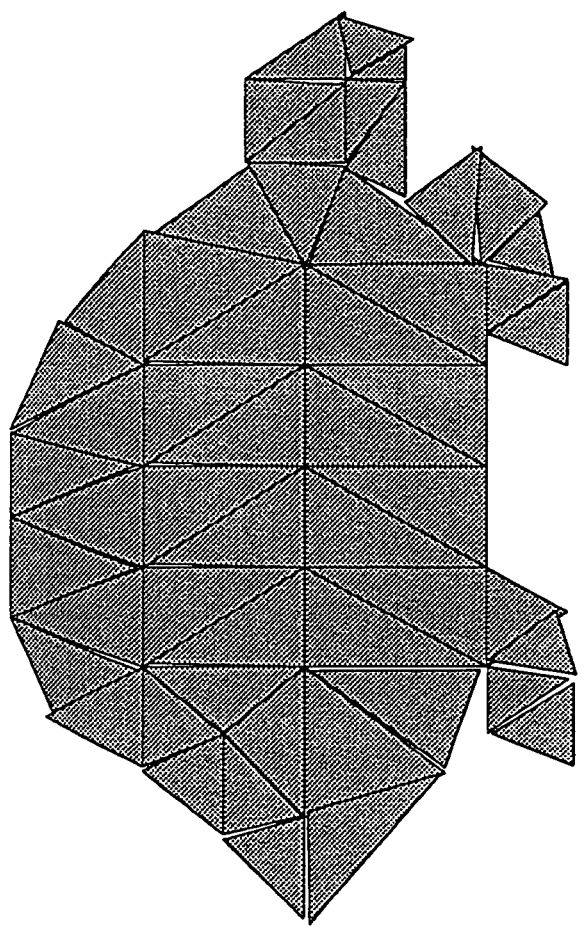
FIG. 9 illustrates an example of a simple 3-D mesh object (MO) comprised of one mesh object layer (MOL), to facilitate understanding of the present invention.
Figure 10:
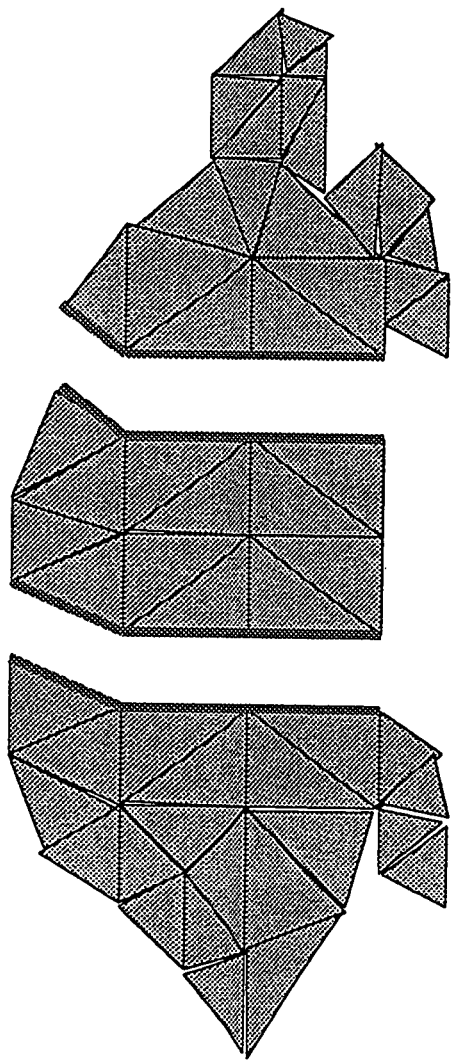
FIG. 10 illustrates an example of three mesh components (MCOM0 through MCOM2) into which the mesh object layer (MOL) shown in FIG. 9 is divided.

FIG. 9 illustrates an example of a simple 3-D MO comprised of one MOL to facilitate understanding of the present invention. FIG. 10 illustrates an example in which the 3-D MOL shown in FIG. 9 is divided into three mesh components (MCOM0 through MCOM2). Information (e.g., an edge, the coordinates of points, the attributes of point units, etc.) corresponding to the boundary portion is shared by adjacent mesh components. Accordingly, the next mesh component can be decoded/coded by reusing some or all of the information generated while a mesh component is decoded/coded.

Figure 11A:
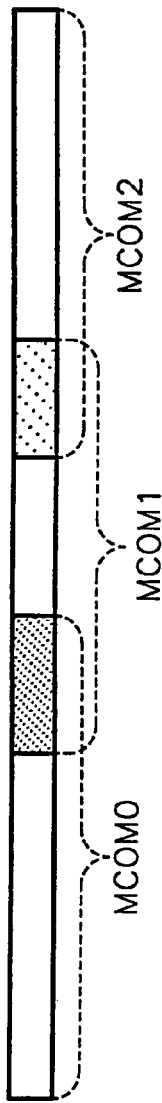
FIGS. 11A, 11B and 11C illustrate examples of information included in mesh components MCOM0 through MCOM2 into which a mesh object layer (MOL) is divided.
Figure 11B:
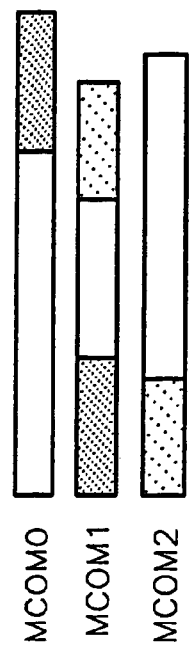
Figure 11C:
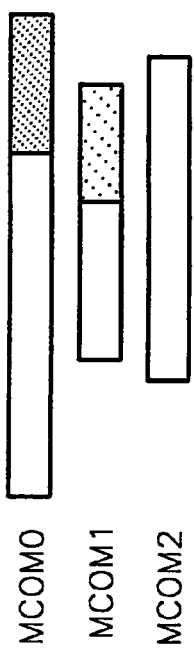

FIGS. 11A through 11C illustrate examples of information included in each mesh component when an MOL is divided into mesh components MCOM0 through MCOM2.

FIG. 11A shows the sharing of information in the boundary portion between mesh components when an MOL is divided into mesh components MCOM0 through MCOM2. Some or all of information existing in the boundary portion is copied, so that adjacent mesh components can share the same information. FIG. 11B shows mesh components MCOM0 through MCOM2 each having information shared by adjacent mesh components. When the redundancy of shared information in each mesh component is allowed as shown in FIG. 11B, all of the mesh components can be independently processed, but compression efficiency is degraded.

Meanwhile, FIG. 11C shows mesh components MCOM0 through MCOM2 when only a mesh component to be first coded has information shared by adjacent mesh components. When there is information shared by an already-coded mesh component, information generated by the already-coded mesh component is used for a mesh component not yet coded, so that no redundant information is generated. However, the respective mesh components are not independently processed.

Figure 12A:
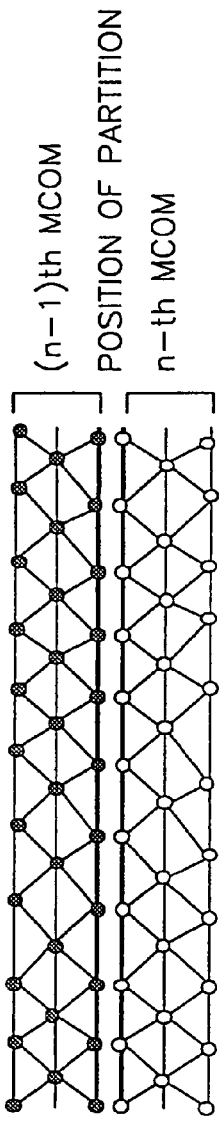
FIGS. 12A, 12B and 12C illustrate examples of a method of processing information shared by two mesh components.
Figure 12B:
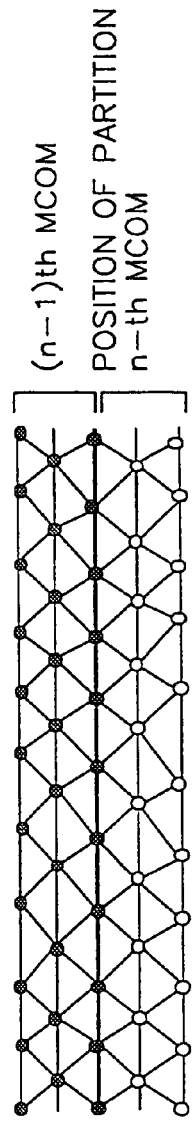
Figure 12C:
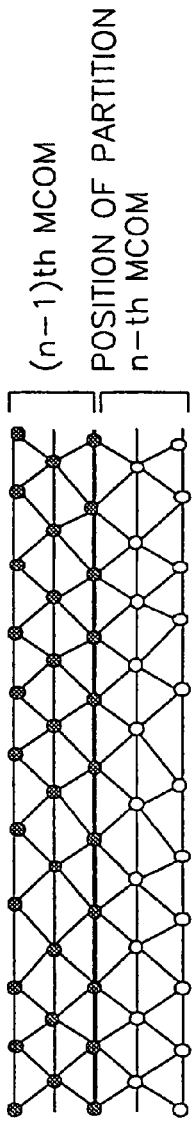

FIGS. 12A through 12C illustrate examples of a method of processing information shared by two mesh components.

FIG. 12A shows two mesh components which are separated independently. Here, the two mesh components share information such as the same sides, the same points and the attributes of the points. Each type of information is copied to two mesh components, and the two mesh components are separated and then independently processed. While the two mesh components are processed, information copied to each mesh component is considered to be different. Hence, when information independently decoded by a decoding portion is collected and used to reconstruct a mesh object layer, the original MOL is transformed, and consequently, the size of a file increases. Referring to FIG. 5 or 7, independent mesh components as shown in FIG. 12A are independently processed by independent coders/decoders.

FIG. 12B shows two mesh components which are not completely separated from each other but only part of the shared information is redundantly coded. A preceding mesh component has all of the shared information, but the next mesh component has only part of the shared information, that is, information on the same points as those of the preceding mesh component. In this case, the same shared point is defined by each of two or more mesh components, but the same point in each is recognized as an identical point. Thus, the original MOL is kept after the mesh components are restored. Also, when the preceding mesh component has not been restored, the boundary portion between the preceding mesh component and the next mesh component can be restored due to restoration of the next mesh component. Referring to FIG. 3, when information generated by an already-operated component coder is used in a component coder not yet operated, the information is part of the shared information. The component coder not yet operated redundantly codes information on the same points shared by the already-operated component coder.

FIG. 12C shows an example where only a preceding mesh component has shared information, and the next mesh component uses all of information generated by the preceding mesh component. In this case, no information is redundantly coded, so that compression efficiency is increased. However, since each mesh component is not independent, it is impossible to restore the boundary portion due to restoration of the next mesh component when the preceding mesh component is not restored. Referring to FIG. 3, when information generated by an already-operated component coder is used in a component coder not yet operated, the information corresponds to the whole of shared information. The component coder not yet operated does not redundantly code all information shared by the already-operated component coder.

A grammar table of ISO/IEC JTC1/SC29/WG11 MPEG-4 SNHC 3-D mesh coding, for accomplishing coding of progressive 3-D mesh information according to the present invention is as follows.

3D_Mesh_Object

MO_start_code: This is a unique 16-bit code which is used for synchronization. The value of this code is always '0000 0000 0010 0000'.

3D_Mesh_Object_Layer

MOL_start_code: This is a unique 16-bit code which is used for synchronization. The value of this code is always '0000 0000 0011 0000'.

mol_id: This unsigned 8-bit integer indicates a unique identifier for the mesh object layer (MOL). A value of 0 indicates a base layer, and a value larger than 0 indicates a refinement layer. The first 3D_Mesh_Object_Layer immediately behind a 3D_Mesh_Object_Header must have mol_id=0, and subsequent 3D_Mesh_Object_Layers within the same 3D_Mesh_Object must have mol_id>0.

N_Vertices denotes the number of vertices in the current resolution of the 3-D mesh, which is used to reduce the number of calculations.

N_Triangles denotes the number of triangles in the current resolution of the 3-D mesh, which is used to reduce the number of calculations.

N_Edges denotes the number of edges in the current resolution of the 3-D mesh, which is used to reduce the number of calculations.

3D_Mesh_Object_Base_Layer

MOBL_start_code: This is a unique 16-bit code which is used for synchronization. The value of this code is always '0000 0000 0011 0001'.

mol_id: This 8-bit unsigned integer which indicates a unique identifier for the mesh object component (MCOM).

last_component: This boolean value indicates if there are more connected components to be decoded. If last_component is true, then the last component has been decoded. Otherwise, there are more components to be decoded. This field is arithmetically coded.

3D_Mesh_Object_Header ccw: This boolean value indicates if the vertex ordering of the decoded faces follows a counterclockwise order.

convex: This boolean value indicates if the model is convex.

solid: This boolean value indicates if the model is solid.

creaseAngle: This 6-bit unsigned integer indicates the crease angle.

coord_header coord_binding: This 2-bit unsigned integer indicates binding of vertex coordinates to the 3-D mesh. The only admissible value is '01'.

coord-bbox: This boolean value indicates whether a bounding box is provided for the geometry. If no bounding box is provided, a default is used.

coord_xmin, coord_ymin, and coord_zmin: These floating-point values indicate the lower left corner of the bounding box having geometry.

coord_size: This floating-point value indicates the size of the bounding box.

coord_quant: This 5-bit unsigned integer denotes the quantization step used for geometry.

coord_pred_type: This 2-bit unsigned integer denotes the type of prediction used to reproduce the vertex coordinates of the mesh.

TABLE 1

| coord_pred_type | prediction type |
|---|---|
| 00 | no prediction |
| 01 | invalid |
| 10 | parallelogram prediction |
| 11 | polygon prediction | coord_nlambda: This 2-bit unsigned integer denotes the number of ancestors used to predict geometry. Admissible values of coord_nlambda are 1 and 3. Table 2 shows admissible values as a function of coord_pred_type.

TABLE 2

| coord_pre_type | coord_nlambda |
|---|---|
| 00 | 1 |
| 01 | invalid |
| 10 | 3 |
| 11 | 1 | coord_lambda: This unsigned integer indicates the weight given to an ancestor for prediction. The number of bits used for this field is equal to coord_quant+3.

normal_header normal_binding: This 2-bit unsigned integer indicates the binding of normals to the 3D mesh. The admissible values are described in Table 3.

TABLE 3

| normal_binding | binding |
|---|---|
| 00 | no normals are coded |
| 01 | one normal is coded per vertex |
| 10 | one normal is coded per face |
| 11 | one normal is coded per corner | normal_bbox: This boolean value should always be false ('0').

normal_quant: This 5-bit unsigned integer indicates the quantization step used for normals.

normal_pred_type: This 2-bit unsigned integer indicates how normal values are predicted.

TABLE 4

| normal_pred_type | prediction type |
|---|---|
| 00 | no prediction |
| 01 | tree prediction |
| 10 | parallelogram prediction |
| 11 | invalid |

TABLE 5

| normal_binding | normal_pred_type |
|---|---|
| 00 | ignored |
| 01 | 10 |
| 10 | 01 |
| 11 | 01 | normal_nlambda: This 2-bit unsigned integer indicates the number of ancestors used to predict normals. Admissible values of normal_nlambda are 1 and 3. Table 6 shows admissible values as a function of normal_pred_type.

TABLE 6

| normal_pred_type | normal_nlambda |
|---|---|
| 00 | 1 |
| 01 | 1 |
| 10 | 3 |
| 11 | 1 | normal_lambda: This unsigned integer indicates the weight given to an ancestor for prediction. The number of bits used for this field is equal to normal_quant+3.

color_header color_binding: This 2-bit unsigned integer indicates the binding of colors to the 3D mesh. The admissible values are described in Table 7.

TABLE 7

| color_binding | binding |
|---|---|
| 00 | no colors are coded |
| 01 | one color is coded per vertex |
| 10 | one color is coded per face |
| 11 | one color is coded per corner | color_bbox: This boolean value indicates if a bounding box for colors is given.

color_rmin, color_gmin and color_bmin: These floating point values give the position of the lower left corner of the bounding box in RGB space.

color_size: This floating point value gives the size of the color bounding box.

color_quant: This 5-bit unsigned integer indicates the quantization step used for colors.

color_pred_type: This 2-bit unsigned integer indicates how colors are predicted.

TABLE 8

| color_pred_type | prediction type |
|---|---|
| 00 | no prediction |
| 01 | tree prediction |
| 10 | parallelogram prediction |
| 11 | invalid |

TABLE 9

| color_binding | color_pred_type |
|---|---|
| 00 | ignored |
| 01 | 10 |
| 10 | 01 |
| 11 | 01 | color_nlambda: This 2-bit unsigned integer indicates the number of ancestors used to predict colors. Admissible values of color_nlambda are 1 and 3. Table 10 shows admissible values as a function of color_pred_type.

TABLE 10

| color_pred_type | color_nlambda |
|---|---|
| 00 | 1 |
| 01 | 1 |
| 10 | 3 |
| 11 | 1 | color_lambda: This unsigned integer indicates the weight given to an ancestor for prediction. The number of bits used for this field is equal to color_quant+3.

texCoord_header texCoord_binding: This 2-bit unsigned integer indicates the binding of textures to the 3D mesh. The admissible values are described in Table 11.

TABLE 11

| texCoord_binding | binding |
|---|---|
| 00 | no textures are coded |
| 01 | one texture is coded per vertex |
| 10 | one texture is coded per face |
| 11 | one texture is coded per corner | texCoord_bbox: This boolean value indicates if a bounding box for textures is given.

texCoord_umin and texCoord_vmin: These two floating point values give the position of the lower left corner of the bounding box in 2D space.

texCoord_size: This floating point value gives the size of the texture bounding box.

texCoord_quant: This 5-bit unsigned integer indicates the quantization step used for textures.

texCoord_pred_type: This 2-bit unsigned integer is always '10' if texCoord_binding is '01', and '01' otherwise.

texCoord_nlambda: This 2-bit unsigned integer indicates the number of ancestors used to predict textures. Admissible values of texCoord_nlambda are 1 and 3. Table 12 shows admissible values as a function of texCoord_pred_type.

TABLE 12

| texCoord_pred_type | texCoord_nlambda |
|---|---|
| 00 | 1 |
| 01 | 1 |
| 10 | 3 |
| 11 | 1 | texCoord_lambda: This unsigned integer indicates the weight given to an ancestor for prediction. The number of bits used for this field is equal to texCoord_quant+3.

Cgd_header

N-Proj_Surface_Spheres is the number of Projected Surface Spheres. Typically, this number is equal to 1.

x_coord_Center_Point is the x-coordinate of the center point (typically the gravity point of the object) of the Projected Surface Sphere.

y_coord_Center_Point is the y-coordinate of the center point (typically the gravity point of the object) of the Projected Surface Sphere.

z_coord_Center_Point is the z-coordinate of the center point (typically the gravity point of the object) of the Projected Surface Sphere.

Normalized_Screen_Distance_Factor indicates where the virtual screen is placed, in relation to the radius of the projected surface sphere. The distance between the center point of the projected surface sphere and the virtual screen is equal to Radius/(Normalized_Screen_Distance_Factor+1). Note that Radius is specified for each Projected Surface Sphere, while Normalized_Screen_Distance_Factor is specified only once.

Radius is the radius of the Projected Surface Sphere.

Min_Proj_Surface is the minimal projected surface value on the corresponding Projected Surface Sphere. This value is often (but not necessarily) equal to one of the Proj_Surface values.

N_Proj_Points is the number of points on the Projected Surface Sphere in which the projected surface will be transmitted. For all other points, the projected surface is determined by linear interpolation. N_Proj_Points is typically small (e.g., 20) for the first Projected Surface Sphere and very small (e.g., 3) for additional Projected Surface Spheres.

Sphere_Point_Coord indicates the index of the point position in an octahedron.

Proj_Surface is the projected surface in the point specified by Sphere_Point_Coord.

vertex_graph vg_simple: This boolean value indicates if the current vertex graph is simple. A simple vertex graph does not contain any loops. This field is arithmetically coded.

vg_last: This boolean value indicates if the current run is the last run starting from the current branching vertex. This field is not coded for the first run of each branching vertex, i.e., when the skip_last variable is true. When not coded the value of vg_last for the current vertex run is considered to be false. This field is arithmetically coded.

vg_forward_run: This boolean flag indicates if the current run is a new run. If it is not a new run, it must be a run previously traversed, indicating a loop in the graph. This field is arithmetically coded.

vg_loop_index: This unsigned integer indicates the index of the current run to which the current loop is connected. Its unary representation (see Table 13) is arithmetically coded. If the variable openloops is equal to vg_loop_index, the trailing '1' in the unary representation is omitted.

TABLE 13

| vg_loop_index | unary representation |
|---|---|
| 0 | 1 |
| 1 | 01 |
| 2 | 001 |
| 3 | 0001 |
| 4 | 00001 |
| 5 | 000001 |
| 6 | 0000001 |
| ... | |
| openloops-1 | openloops-1 0's | vg_run_length: This unsigned integer indicates the length of the current vertex run. Its unary representation (see FIG. 14) is arithmetically coded.

TABLE 14

| vg_run_length | unary representation |
|---|---|
| 1 | 1 |
| 2 | 01 |
| 3 | 001 |
| 4 | 0001 |
| 5 | 00001 |
| 6 | 000001 |
| 7 | 0000001 |
| 8 | 00000001 |
| n | n − 1 0's followed by 1 | vg_leaf: This boolean flag indicates if the last vertex of the current run is a leaf vertex. If it is not a leaf vertex, it is a branching vertex. This field is arithmetically coded.

vg_loop: This boolean flag indicates if the leaf of the current run connects to a branching vertex of the graph, indicating a loop. This field is arithmetically coded.

triangle_tree tt_run_length: This unsigned integer indicates the length of the current triangle run. Its unary representation (see Table 15) is arithmetically coded.

TABLE 15

| tt_run_length | unary representation |
|---|---|
| 1 | 1 |
| 2 | 01 |
| 3 | 001 |
| 4 | 0001 |
| 5 | 00001 |
| 6 | 000001 |
| 7 | 0000001 |
| 8 | 00000001 |
| n | n – 1 0's followed by 1 | tt_leaf: This boolean flag indicates if the last triangle of the current run is a leaf triangle. If it is not a leaf triangle, it is a branching triangle. This field is arithmetically coded.

triangulated: This boolean value indicates if the current component contains triangles only. This field is arithmetically coded.

marching_triangle: This boolean value is determined by the position of the triangle in the triangle tree. The value marching_triangle=0 if the triangle is a leaf or branching triangle, and marching_triangle=1 otherwise.

marching_pattern: This boolean flag indicates the marching pattern of edges inside a triangle run. A "0" stands for a march to the left, and a 1 for a march to the right. This field is arithmetically coded.

polygon_edge: This boolean flag indicates whether the base of the current triangle is an edge that should be kept when reconstructing the 3D mesh object. If the base of the current triangle is not to be kept, it is discarded. This field is arithmetically coded.

triangle
coord_bit: This boolean value indicates the value of a geometry bit. This field is arithmetically coded.

coord_heading_bit: This boolean value indicates the value of a heading geometry bit. This field is arithmetically coded.

coord_sign_bit: This boolean value indicates the sign of a geometry sample. This field is arithmetically coded.

coord_trailing_bit: This boolean value indicates the value of a trailing geometry bit. This field is arithmetically coded.

normal_bit: This boolean value indicates the value of a normal bit. This field is arithmetically coded.

normal_heading_bit: This boolean value indicates the value of a heading normal bit. This field is arithmetically coded.

normal_sign_bit: This boolean value indicates the sign of a normal sample. This field is arithmetically coded.

normal_trailing_bit: This boolean value indicates the value of a normal trailing bit. This field is arithmetically coded.

color_bit: This boolean value indicates the value of a color bit. This field is arithmetically coded.

color_heading_bit: This boolean value indicates the value of a heading color bit. This field is arithmetically coded.

color_sign_bit: This boolean value indicates the sign of a color sample. This field is arithmetically coded.

color_trailing_bit: This boolean value indicates the value of a trailing color bit. This field is arithmetically coded.

texCoord_bit: This boolean value indicates the value of a texture bit. This field is arithmetically coded.

texCoord_heading_bit: This boolean value indicates the value of a heading texture bit. This field is arithmetically coded.

texCoord_sign_bit: This boolean value indicates the sign of a texture sample. This field is arithmetically coded.

texCoord_trailing_bit: This boolean value indicates the value of a trailing texture bit. This field is arithmetically coded.

3D_Mesh_Object_Forest_Split
MOFS_start_code: This is a unique 32-bit code that is used for synchronization. The value of this code is always '0000 0000 0011 0010'.

mofs_id: This 8-bit unsigned integer specifies a unique identifier for the forest split component.

pre_smoothing: This boolean value indicates whether the current forest split operation uses a pre-smoothing step to globally predict vertex positions.

pre_smoothing_n: This integer value indicates the number of iterations of the pre-smoothing filter.

pre_smoothing_lambda: This floating point value is the first parameter of the pre-smoothing filter.

pre_smoothing_mu: This floating point value is the second parameter of the pre-smoothing filter.

post_smoothing: This boolean value indicates whether the current forest split operation uses a post-smoothing step to remove quantization artifacts.

post_smoothing_n: This integer value indicates the number of iterations of the post-smoothing filter.

post_smoothing_lambda: This floating point value is the first parameter of the post-smoothing filter.

post_smoothing_mu: This floating point value is the second parameter of the post-smoothing filter.

sharp_edges: This boolean value indicates if data that marks smoothing discontinuity edges, has been included in the bitstream. If sharp_edges==0 no edge is marked as a smoothing discontinuity edge. If smoothing discontinuity edges are marked, then both the pre-smoothing and post-smoothing filters take them into account.

fixed_vertices: This boolean value indicates if data not moving during the smoothing process has been included in the bitstream. If fixed_vertices==0, none of the vertices are allowed to move. If fixed vertices are marked, then both the pre-smoothing and post-smoothing filters take them into account.

edge_mark: This boolean value indicates if a corresponding edge is marked as a smoothing discontinuity edge.

vertex_mark: This boolean value indicates whether a corresponding vertex is fixed.

tree_edge: This boolean value indicates if an edge should be added to the forest built so far.

other_update: This boolean value indicates whether updates for vertex coordinates and properties associated with faces not incident to any tree of the forest, follow in the bitstream.

3D_Mesh_Object

| 3D_Mesh_Object ( ) { | | |
|---|---|---|
| 3D_MO_start_code | 16 | uimsbf |
| 3D_Mesh_Object_Header ( ) | | |
| do { | | |
| 3D_Mesh_Object_Layer ( ) | | |
| } while (nextbits_bytealigned | | |
| ( )==3D_MOL_start_code) | | |
| } | | |

3D_Mesh_Object_Header

| 3D_Mesh_Object_Header ( ) { | | |
|---|---|---|
| Ccw | 1 | blsbf |
| Convex | 1 | blsbf |
| Solid | 1 | blsbf |
| CreaseAngle | 6 | uimsbf |

-continued

```
        Coord_header ( )
        Normal_header ( )
        Color_header ( )
        TexCoord_header ( )
    cgd_data                                        1           blsbf
    if (cgd_data==1)
        cgd_header ( )
    }
```

3D_Mesh_Object_Layer

```
3D_Mesh_Object_Layer ( ) {
        3D_MOL_start_code                           16          uimsbf
        Mol_id                                      8           uimsbf
    if (cgd_data==1) {
        N_Vertices                                  24          uimsbf
        N_Triangles                                 24          uimsbf
        N_Edges                                     24          uimsbf
    }
        if (mol_id=='00000000')
            3D_Mesh_Object_Base_Layer ( )
        else
            3D_Mesh_Object_Forest_Split ( )
}
```

3D_Mesh_Object_Base_Layer

```
3D_Mesh_Object_Base_Layer ( )
    do {
        3D_MOBL_start_code                          16          uimsbf
        mobl_id                                     8           uimsbf
        start_qcoder ( )
        do {
            connected_component ( )
            last_component                                      bac
        } while (!last_component)
    } while (nextbits_bytealigned ( )==
        3D_MOBL_start_code)
    }
``` coord_header

```
coord_header ( ) {
    coord_binding                                   2           uimsbf
    coord_bbox                                      1           blsbf
    if (coord_bbox) {
        coord_xmin                                  32          ieeefp
        coord_ymin                                  32          ieeefp
        coord_zmin                                  32          ieeefp
        coord_size                                  32          ieeefp
    }
    coord_quant                                     5           uimsbf
    coord_pred_type                                 2           uimsbf
    if (coord_pred_type=='10') {
        coord_nlambda                               2           uimsbf
        for (i=1;i<coord_nlambda;i++)
            coord_lambda                            coord_quant+3
    }
}
``` normal_header

```
normal_header ( ) {
    normal_binding                                  2           uimsbf
    if (normal_binding !='00'){
        normal_bbox                                 1           blsbf
```

-continued

```
        normal_quant                                5           uimsbf
        normal_pred_type                            2           uimsbf
        if (normal_pred_type=='10') {
            normal_nlambda                          2           uimsbf
            for (i=1;i<normal_nlambda;i++)
                normal_lambda                       normal_quant+3
        }
    }
}
``` color_header

```
color_header ( ) {
    color_binding                                   2           uimsbf
    if (color_binding!='00') {
        color_bbox                                  1           blsbf
        if (color_bbox) {
            color_rmin                              32          ieeefp
            color_gmin                              32          ieeefp
            color_bmin                              32          ieeefp
            color_size                              32          ieeefp
        }
        color_quant                                 5           uimsbf
        color_pred_type                             2           uimsbf
        if (color_pred_type=='10') {
            color_nlambda                           2           uimsbf
            for (i=1;i<color_nlambda;i++)
                color_lambda                        color_quant+3
        }
    }
}
``` texCoord_header

```
texCoord_header ( ) {
    texCoord_binding                                2           uimsbf
    if (texCoord_binding!='00') {
        texCoord_bbox                               1           blsbf
        if (texCoord_bbox) {
            texCoord_umin                           32          ieeefp
            texCoord_vmin                           32          ieeefp
            texCoord_size                           32          ieeefp
        }
        texCoord_quant                              5           uimsbf
        texCoord_pred_type                          2           uimsbf
        if (texCoord_pred_type=='10'){
            texCoord_nlambda                        2           uimsbf
            for
            (i=1;i<texCoord_nlambda;i++)
                texCoord_lambda                     texCoord_quant+3
        }
    }
}
``` cgd_header

```
cgd_header ( ) {
    N_Proj_Surface_Spheres                          4           uimsbf
    if (N_Proj_Surface_Spheres<>0) {
        x_coord_Center_Point                        32          ieeefl
        y_coord_Center_Point                        32          ieeefl
        z_coord_Center_Point                        32          ieeefl
        Normalized_Screen_Distance_Factor           8           uimsbf
        for (I=1;i<=N_Proj_Surface_Spheres;i++) {
            Radius                                  32          ieeefl
            Min_Proj_Surface                        32          ieeefl
            N_Proj_Points                           8           uimsbf
            for (j=1;j<=N_Proj_Points;j++) {
```

```
                        -continued
    Sphere_Point_Coord                  11   uimsbf
    Proj_Surface                        32   ieeefl
        }
      }
    }
}
``` connected_component

```
connected_component ( ) {
    vertex_graph ( )
    triangle_tree ( )
    triangle_data ( )
}
``` vertex_graph

```
vertex_graph ( ) {
    vg_simple                           0–16   bac
    depth=0
    skip_last=0
    openloops=0
    do {
        do {
            if (!skip_last) {
                vg_last                 0–16   bac
                if (openloops>0) {
                    vg_forward_run      0-     bac
                    if (!vg_forward_run) {
                        openloop-
                        if (openloops>0)
                            vg_loop_index   0-     bac
                        break
                    }
                }
            }
            vg_run_length               0-     uac
            vg_leaf                     0–16   bac
            if (vg_leaf&&!vg_simple) {
                vg_loop                 0–16   bac
                if (vg_loop)
                    openloops++
            }
        } while (0)
        if (vg_leaf==(vg_last&!skip_last))
            if (vg_last&!skip_last)
                depth--
            else
                depth++
        skip_last=!vg_leaf
    } while (depth >= 0 )
}
``` triangle_tree

```
triangle_tree ( ) {
    depth = 0
    ntriangles = 0
    do {
        tt_run_length                   0–16   bac
        ntriangles += tt_run_length
        tt_leaf                         0–16   bac
        if (tt_leaf)
            depth--
        else
            depth++
    } while (depth >= 0)
}
``` triangle_data

```
triangle_data ( ) {
    triangulated                        0–16   bac
    root_triangle ( )
    for (i=1; i<ntriangles;i++)
        triangle ( )
}
``` root_triangle

```
root_triangle ( ) {
    if (marching_triangle)
        marching_pattern                0–16   bac
    root_coord ( )
    root_normal ( )
    root_color ( )
    root_texCoord ( )
}
root_coord ( ) {
    root_coord_sample ( )
    coord_sample ( )
    coord_sample ( )
}
root_normal ( ) {
    if (normal_binding != '00') {
        root_normal_sample ( )
        if (normal_binding != '10') {
            normal_sample ( )
            normal_sample ( )
        }
    }
}
root_color ( ) {
    if (color_binding != '00') {
        root_color_sample ( )
        if (color_binding != '10') {
            color_sample ( )
            color_sample ( )
        }
    }
}
root_texCoord ( ) {
    if (texCoord_binding != '00') {
        root_texCoord_sample ( )
        texCoord_sample ( )
        texCoord_sample ( )
    }
}
``` triangle

```
triangle ( ) {
    if (marching_triangle)
        marching_pattern                0–16   bac
    if (!triangulated)
        polygon_edge                    0–16   bac
    coord ( )
    normal ( )
    color ( )
    texCoord ( )
}
coord ( ) {
    if (!visited)
        coord_sample ( )
}
normal ( ) {
    if (normal_binding == '01') {
        if (!visited)
            normal_sample ( )
    }
    else if (normal_binding == '10') {
```

```
            if (triangulated || polygon_edge)
                normal_sample ( )
        }
        else if (normal_binding == '11') {
            if (triangulated || polygon_edge) {
                normal_sample ( )
                normal_sample ( )
            }
            normal_sample ( )
        }
    }
}
color ( ) {
    if (color_binding == '01') {
        if (!visited)
            color_sample ( )
    }
    else if (color_binding == '10') {
        if (triangulated || polygon_edge)
            color_sample ( )
    }
    else if (color_binding == '11') {
        if (triangulated || polygon_edge) {
            color_sample ( )
            color_sample ( )
        }
        color_sample ( )
    }
}
texCoord ( ) {
    if (texCoord_binding == '01') {
        if (!visited)
            texCoord_sample ( )
    }
    else if (texCoord_binding == '11') {
        if (triangulated || polygon_edge) {
            texCoord_sample ( )
            texCoord_sample ( )
        }
        texCoord_sample ( )
    }
}
coord_root_sample ( ) {
    for (i=0; i<3; i++)
        for (j=0; j<coord_quant; j++)
            coord_bit                              0–1    bac
}
normal_root_sample ( ) {
    for (i=0; i<1; i++)
        for (j=0; j<normal_quant; j++)
            normal_bit                             0–1    bac
}
color_root_sample ( ) {
    for (i=0; i<3; i++)
        for (j=0; j<color_quant; j++)
            color_bit                              0–1    bac
}
texCoord_root_sample ( ) {
    for (i=0; i<2; i++)
        for (j=0; j<texCoord_quant; j++)
            texCoord_bit                           0–1    bac
}
coord_sample ( ) {
    for (i=0; i<3; i++) {
        j=0
        do {
            coord_leading_bit                      0–16   bac
            j++
        } while (j<coord_quant && !coord_leading_bit)
        if (coord_leading_bit) {
            coord_sign_bit                         0–1    bac
            do {
                coord_trailing_bit
            } while (j<coord_quant)
        }
    }
}
normal_sample ( ) {
    for (i=0; i<1; i++) {
        j=0
        do {
            normal_leading_bit                     0–16   bac
            j++
        } while (j<normal_quant && !normal_leading_bit)
        if (normal_leading_bit) {
            normal_sign_bit                        0–1    bac
            do {
                normal_trailing_bit
            } while (j<normal_quant)
        }
    }
}
color_sample ( ) {
    for (i=0; i<3; i++) {
        j=0
        do {
            color_leading_bit                      0–16   bac
            j++
        } while (j<color_quant && !color_leading_bit)
        if (color_leading_bit) {
            color_sign_bit                         0–1    bac
            do {
                color_trailing_bit
            } while (j<color_quant)
        }
    }
}
texCoord_sample ( ) {
    for (i=0; i<2; i++) {
        j=0
        do {
            texCoord_leading_bit                   0–16   bac
            j++
        } while (j<texCoord_quant && !texCoord_leading_bit)
        if (texCoord_leading_bit) {
            texCoord_sign_bit                      0–1    bac
            do {
                texCoord_trailing_bit
            } while (j<texCoord_quant)
        }
    }
}
```

3D_Mesh_Object_Forest_Split

```
3D_Mesh_Object_Forest_Split ( ) {
    do {
        3D_MOFS_start_code                         16     uimsbf
        mofs_id                                    8      uimsbf
        pre_smoothing                              1      blsbf
        if(pre_smoothing)
            pre_smoothing_parameters ( )           1      blsbf
        post_smoothing
        if(post_smoothing)
            post_smoothing parameters( )
            start_qcoder( )
        sharp_edges                                1      blsbf
        if(sharp_edges)
            edge_marks( )
        fixed_vertices                             1      blsbf
        if(fixed_vertices)
            vertex_marks( )
        for each connected component {
            fs_pre_update( )
            fs_post_update( )
        }
    } while (nextbits_bytealigned( )==
        3D_MOFS_start_code)
}
pre_smoothing_parameters( ) {
    pre_smoothing_n                                8      nimsbf
    pre_smoothing_lambda                           32     ieefl
    pre_smoothing_mu                               32     ieefl
}
post_smoothing_parameters( ) {
```

```
        post_smoothing_n                     8   nimsbf
        post_smoothing_lambda                32  ieefl
        post_smoothing_mu                    32  ieefl
}
edge_marks ( ) {
        for each edge
                edge_mark                    }   bac
}
vertex_marks ( ) {
        for each vertex
                vertex_mark                  }   bac
}
fs_pre_updata( ) {
        forest( )
        for each tree in forest {
                triangle_tree( )
                for each vertex in tree loop
                        visted = 1
                        triangle_data( )
        }
}
forest ( ) {
        for each edge
                if (creates no loop in forest)
                        tree_edge            1   bac
}
fs_post_updata( ) {
        for each tree in forest {
        for each vertex in tree loop
                visted = 0
                tree_loop_property_update( )
        }
        other_update                         1   blsf
        if(other_updata)
          other_property_updata( )
}
tree_loop_property_update ( ) {
        for each triangle incident to tree {
                coord_update( )
                normal_update( )
                color_update( )
                texCoord_update( )
        }
}
other_property_update ( ) {
        for each triangle no incident to any tree in forest {
          coord_update( )
          normal_update( )
          color_update( )
          texCoord_update( )
        }
}
coord_update( ) {
        if (!visited)
                coord_sample( )
normal_updata( ) {
        if (normal_binding=='01') {
                if (!visited)
                        normal_sample( )
        }
        else if (normal_binding =='10') {
                normal_sample( )
        }
        else if (normal_binding == '11') {
                if (1st corner adjacent to tree)
                        normal_sample( )
                if (2nd corner adjacent to tree)
                        normal_sample( )
                if (3rd corner adjacent to tree)
                        normal_sample( )
        }
}
color_updata( ) {
        if (color_binding=='01') {
                if (!visited)
                        color_sample( )
        }
        else if (color_binding =='10') {
                color_sample( )
        }
```

```
        else if (color_binding == '11') {
                if (1st corner adjacent to tree)
                        color_sample( )
                if (2nd corner adjacent to tree)
                        color_sample( )
                if (3rd corner adjacent to tree)
                        color_sample( )
        }
}
texCoord_updata( ) {
        if (texCoord_binding=='01') {
                if (!visited)
                        texCoord_sample( )
        }
        else if (texCoord_binding =='10') {
                texCoord_sample( )
        }
        else if (texCoord_binding == '11') {
                if (1st corner adjacent to tree)
                        texCoord_sample( )
                if (2nd corner adjacent to tree)
                        texCoord_sample( )
                if (3rd corner adjacent to tree)
                        texCoord_sample( )
        }
}
```

As described above, in a progressive 3-D mesh information coding/decoding method and apparatus according to the present invention, the apparatus has a data structure in which data is dealt with as mesh components (MCOM), so that division by components is possible even on a compressed bit stream. Thus, a decoding portion can easily reproduce components as soon as decoding by components is completed. Also, progressive image reproduction and capability of coping with transmission errors is better reinforced than in conventional 3-D mesh information coding methods. Furthermore, when a model is divided into mesh object layers (MOLs) or mesh components (MCOMs), the MOLs or MCOMs can be independently coded and decoded. Such a structure is simple, and can be realized so that redundant information can be easily removed as necessary.

What is claimed is:

1. A progressive 3-D mesh coding method comprising:
dividing a 3-D mesh into a plurality of mesh components by one of synthesizing and dividing independent mesh information according to a size of data to be coded, wherein each of the mesh components corresponds to a different partition of the 3-D mesh;
coding, performed by using at least one processor, each of the plurality of mesh components, wherein the plurality of coded mesh components are independently decoded and incrementally reproduced as unit mesh parts of the 3-D mesh; and
multiplexing the plurality of coded mesh components into a compressed bit stream and transmitting the compressed bit stream.

2. A progressive 3-D mesh coding method comprising:
dividing a 3-D mesh into a plurality of mesh components by one of synthesizing and dividing independent mesh information according to a size of data to be coded, wherein each of the mesh components corresponds to a different partition of the 3-D mesh;
coding, performed by using at least one processor, each of the plurality of mesh components; and
multiplexing the plurality of coded mesh components into a compressed bit stream and transmitting the compressed bit stream, wherein each of the plurality of mesh components includes at least connectivity information, geometry information and photometry information which are necessary to reconstruct the coded mesh components themselves.

3. The progressive 3-D mesh coding method as claimed in claim 1, wherein dividing the 3-D mesh into the plurality of mesh components comprises:
  extracting one or more mesh object layers from a 3-D mesh; and
  dividing the one or more mesh object layers each into the plurality of mesh components.

4. The progressive 3-D mesh coding method as claimed in claim 1, wherein in the coding, each of the plurality of mesh components is coded, and information generated while a mesh component is coded is reused in the process for coding a mesh component which has not yet been coded.

5. A progressive 3-D mesh decoding method comprising:
  dividing a transmitted bit stream into a plurality of coded mesh components, wherein the plurality of mesh components are incrementally reproduced as unit mesh parts of a 3-D mesh;
  independently decoding, performed by using at least one processor, each of the plurality of coded mesh components; and
  reconstructing the 3-D mesh by synthesizing the plurality of decoded mesh components and by removing redundant information between adjacent mesh components.

6. The progressive 3-D mesh decoding method as claimed in claim 5, wherein dividing the transmitted bit stream into the plurality of coded mesh components comprises:
  classifying the transmitted bit stream into one or more decoded mesh object layers; and
  dividing each of the one or more decoded mesh object layers into a plurality of mesh components.

7. A progressive 3-D mesh coding/decoding method comprising:
  extracting one or more mesh object layers from a 3-D mesh and dividing each of the mesh object layers into a plurality of independent mesh components;
  independently coding and transmitting, performed by using at least one processor, the plurality of mesh components for each of the one or more mesh object layers, wherein each of the plurality of coded mesh components include information necessary such that, when decoded, the plurality of coded mesh components are reproduced as a unit mesh part of the 3-D mesh;
  obtaining a plurality of independent mesh components by decoding the plurality of independently coded and transmitted mesh components; and
  synthesizing the plurality of obtained mesh components and removing redundant information between adjacent mesh components to reconstruct the original 3-D mesh.

8. A progressive 3-D mesh coding apparatus comprising:
  a 3-D data analyzer for receiving a 3-D mesh and reconstructing the input 3-D mesh into a plurality of mesh components by one of synthesizing and dividing independent mesh information according to a size of data to be coded;
  a plurality of component coders for coding the plurality of mesh components; and
  a multiplexer for multiplexing the plurality of coded mesh components into a compressed bit stream, wherein the plurality of coded mesh components are decoded and incrementally reproduced as unit mesh parts of the 3-D mesh.

9. The progressive 3-D mesh coding apparatus as claimed in claim 8, wherein the 3-D data analyzer comprises:
  a 3-D mesh object layer analyzer for dividing the input 3-D mesh into one or more mesh object layers; and
  a plurality of mesh component analyzers for again dividing each of one or more mesh object layers into a plurality of mesh components.

10. The progressive 3-D mesh coding apparatus as claimed in claim 8, wherein when the plurality of component coders code the plurality of mesh components, a component coder which has not yet performed coding performs coding using coding information generated in a component coder which has already performed coding.

11. A progressive 3-D mesh decoding apparatus for progressively decoding a bit stream decoded by and transmitted from a progressive 3-D mesh information coding apparatus, comprising:
  a demultiplexer for dividing the transmitted bit stream into a plurality of coded mesh components;
  a plurality of component decoders for decoding the plurality of coded mesh components, wherein the plurality of decoded mesh components are incrementally reproduced as unit mesh parts of a 3-D mesh; and
  a 3-D data synthesizer for synthesizing the plurality of decoded mesh components and removing redundant information between adjacent mesh components to reconstruct the 3-D mesh.

12. A progressive 3-D mesh coding/decoding apparatus comprising:
  a 3-D mesh object layer analyzer for receiving a 3-D mesh, dividing an input 3-D mesh into one or more mesh object layers, and again dividing each mesh object layer into a plurality of independent mesh components;
  a plurality of mesh component coders for independently coding and transmitting the plurality of independent mesh components, wherein each of the plurality of coded mesh components include information necessary such that, when decoded, the plurality of coded mesh components are rendered as a unit mesh part of the 3-D mesh; and
  a plurality of mesh component decoders for decoding the plurality of mesh components which are independently coded and transmitted, to obtain a plurality of independent mesh components and synthesizing the plurality of obtained mesh components and removing redundant information between adjacent mesh components to reconstruct the original 3-D mesh.

* * * * *

UNITED STATES PATENT AND TRADEMARK OFFICE
CERTIFICATE OF CORRECTION

| | | |
|---|---|---|
| PATENT NO. | : 8,446,948 B2 | Page 1 of 1 |
| APPLICATION NO. | : 11/785565 | |
| DATED | : May 21, 2013 | |
| INVENTOR(S) | : Jang et al. | |

It is certified that error appears in the above-identified patent and that said Letters Patent is hereby corrected as shown below:

In the Specification

Column 1, Line 6, delete "continuation in-part" and insert -- continuation --, therefor.

Signed and Sealed this
Twenty-ninth Day of July, 2014

Michelle K. Lee
*Deputy Director of the United States Patent and Trademark Office*